US011390532B2

(12) United States Patent
Allimant et al.

(10) Patent No.: US 11,390,532 B2
(45) Date of Patent: Jul. 19, 2022

(54) ENVIRONMENTAL BARRIER (71) Applicant: SAINT-GOBAIN CENTRE DE RECHERCHES ET D'ETUDES EUROPEEN, Courbevoie (FR)

(72) Inventors: Alain Allimant, Caumont sur Durance (FR); Howard Wallar, Rutland, MA (US)

(73) Assignee: SAINT-GOBAIN CENTRE DE RECHERCHES ET D'ETUDES EUROPEEN, Courbevoie (FR)

(*) Notice: Subject to any disclaimer, the term of this patent is extended or adjusted under 35 U.S.C. 154(b) by 12 days.

(21) Appl. No.: 16/965,265

(22) PCT Filed: Jan. 31, 2019

(86) PCT No.: PCT/EP2019/052440
§ 371 (c)(1),
(2) Date: Jul. 27, 2020

(87) PCT Pub. No.: WO2019/149856
PCT Pub. Date: Aug. 8, 2019

(65) Prior Publication Data
US 2021/0070661 A1  Mar. 11, 2021

(30) Foreign Application Priority Data

Jan. 31, 2018  (FR) ...................................... 1850823

(51) Int. Cl.
| C04B 35/16 | (2006.01) |
| C04B 35/50 | (2006.01) |
| C01B 33/20 | (2006.01) |
| C23C 4/04 | (2006.01) |
| C23C 4/134 | (2016.01) |
| C04B 35/622 | (2006.01) |
| C04B 35/626 | (2006.01) |

(52) U.S. Cl.
CPC .............. *C01B 33/20* (2013.01); *C04B 35/16* (2013.01); *C04B 35/62222* (2013.01); *C04B 35/62695* (2013.01); *C23C 4/134* (2016.01); *C01P 2004/52* (2013.01); *C01P 2004/61* (2013.01); *C04B 35/62665* (2013.01); *C04B 2235/3427* (2013.01); *C04B 2235/9669* (2013.01)

(58) Field of Classification Search
CPC ....... C01B 33/20; C04B 35/16; C04B 35/481; C04B 35/50; C04B 35/505; C23C 4/134
See application file for complete search history.

(56) References Cited

U.S. PATENT DOCUMENTS

| 6,254,935 | B1 | 7/2001 | Eaton et al. | |
| 6,916,534 | B2 * | 7/2005 | Wataya | ............. C04B 35/62695 428/402 |
| 10,252,919 | B2 * | 4/2019 | Billieres | ................ C01G 27/02 |
| 2009/0202735 | A1 | 8/2009 | Marlin et al. | |
| 2015/0298986 | A1 * | 10/2015 | Billieres | ................ C01F 17/32 206/710 |
| 2021/0061716 | A1 * | 3/2021 | Allimant | ........... C04B 35/62695 |
| 2021/0115548 | A1 * | 4/2021 | Allimant | ............... C04B 35/505 |

FOREIGN PATENT DOCUMENTS

| EP | 1239055 | A2 | 9/2002 |
| EP | 3243925 | A1 | 11/2017 |
| WO | 2010/072978 | A1 | 7/2010 |
| WO | 2010/103497 | A2 | 9/2010 |
| WO | 2014/083544 | A1 | 6/2014 |

OTHER PUBLICATIONS

International Search Report corresponding to International Application No. PCT/EP2019/052440 dated Mar. 8, 2019, 7 pages.
Yue Xu et al., "Rare earth silicate environmental barrier coatings: Present status and prospective", Ceramics International; vol. 43, No. 8, Feb. 1, 2017, pp. 5847-5855.

* cited by examiner

*Primary Examiner* — Karl E Group
(74) *Attorney, Agent, or Firm* — Ronald M. Kachmarik; Cooper Legal Group LLC (57) ABSTRACT

A powder formed of fused particles. More than 95% by number of the feed particles exhibiting a circularity of greater than or equal to 0.85. The powder contains more than 88% of a silicate of one or more elements chosen from Zr, Hf, Y, Ce, Sc, In, La, Gd, Nd, Sm, Dy, Er, Yb, Eu, Pr, Ho and Ta, less than 10% of a dopant, as percentage by weight based on the oxides. The powder has a median particle size $D_{50}$ of less than 15 μm, a 90 percentile particle size, $D_{90}$, of less than 30 μm, and a size dispersion index $(D_{90}-D_{10})/D_{10}$ of less than 2. The powder has a relative density of greater than 90%. The $D_n$ percentiles of the powder are the particle sizes corresponding to the percentages, by number, of n %, on the cumulative distribution curve of the size of the particles of the powder. The particle sizes are classified in increasing order.

17 Claims, 2 Drawing Sheets

ENVIRONMENTAL BARRIER

TECHNICAL FIELD

The invention relates to a feed powder intended to be deposited by plasma spraying to form an environmental barrier coating, to a method for manufacturing such a feed powder, and to a body protected by an environmental barrier coating obtained by plasma spraying said feed powder.

STATE OF THE ART

The composite materials based on silicon carbide (SiC), and particularly SiC—SiC or SiC—$Si_3N_4$ composites, exhibit high-temperature mechanical properties which are particularly useful in applications such as gas turbines, heat exchangers or internal combustion engines.

They are particularly useful for engine manufacturers in the aeronautical industry who, in order to respond to economic and environmental constraints, have to increase the temperatures of the gases in the combustion chambers of jet engines above 1200° C., indeed even up to 1400° C.

However, in aqueous environments, that is to say in the presence of water and/or water vapor, silicon carbide-based composites have a tendency to degrade, as is described in particular in U.S. Pat. No. 6,254,935. To protect these composites, an environmental barrier coating, or EBC, comprising silica is conventionally applied. Advantageously, an environmental barrier coating prevents excessively rapid degradation of the composites in an oxidizing aqueous environment, in particular in the presence of water vapor, at high temperature.

Under extreme conditions, however, the silica may volatilize. To reduce this volatilization, coatings based on mullite have been proposed by ORNL (Oak Ridge National Laboratory) and coatings based on barium strontium aluminosilicate (BSAS) were developed by NASA during the 1990s and 2000s.

US 2009/0202735 also discloses a coating manufactured from a powder formed of fused particles which is sprayed by plasma spraying.

Environmental barrier coatings are also known which are based on silicates of rare earth metals which advantageously exhibit a coefficient of expansion close to that of SiC and a stability in humid air greater than that of BSAS. WO 2010/072978 A1 for example discloses plasma spraying of an underlayer of yttrium silicate using a $Y_2Si_2O_7$ powder, then deposition of an outer layer of mullite and of yttrium silicate. However, the resistance to humid air still has room for improvement.

There remains an ongoing need for environmental barrier coatings
  exhibiting improved efficacy, in particular for protecting parts made of a ceramic-matrix composite material, in particular made of SiC—SiC, and more particularly for protecting combustion chambers of jet engines, and
  which may be manufactured by simple plasma spraying.
One aim of the invention is to satisfy this need.

SUMMARY OF THE INVENTION

According to the invention, this aim is achieved by means of a powder (hereinafter "feed powder") formed of fused particles (hereinafter "feed particles"), more than 95% by number of said feed particles exhibiting a circularity of greater than or equal to 0.85, said powder containing more than 88%, preferably more than 90%, indeed even more than 95%, or even more than 98%, or also more than 99%, of a silicate of one or more elements chosen from Zr, Hf, Y, Ce, Sc, In, La, Gd, Nd, Sm, Dy, Er, Yb, Eu, Pr, Ho and Ta, preferably chosen from Zr, Hf, Y, Ce, Sc, In, La, Gd, Nd, Sm, Dy, Er, Yb, Eu, Pr and Ta, preferably chosen from Y, Yb, Sc and Er, less than 10%, preferably less than 5%, of a dopant, as percentage by weight based on the oxides, and having:
  a median particle size $D_{50}$ of less than 15 μm, a 90 percentile particle size $D_{90}$ of less than 30 μm, and a size dispersion index with respect to the 10 percentile particle size $D_{10}$, $(D_{90}-D_{10})/D_{10}$, of less than 2;
  a relative density of greater than 90%, preferably of greater than 95%.

The silicate is preferably a monosilicate or a disilicate, indeed even a mixture of these two types of silicates.

The cumulative specific volume of the pores having a radius of less than 1 μm is preferably less than 10% of the bulk volume of the powder.

A feed powder according to the invention is therefore a very pure powder largely composed of spherical particles. This powder is noteworthy, in particular, due to the very low particle size dispersion, with respect to $D_{10}$, due to the small amount of particles exhibiting a size of greater than 30 μm, and due to a very high relative density.

The last characteristic implies a very small amount of hollow particles, indeed even essentially zero. The particle size distribution ensures very homogeneous fusion during the spraying.

The resistance to hot and humid atmospheres has proven to be particularly effective.

Lastly, a feed powder according to the invention has high flowability, which makes it possible to manufacture the environmental barrier coating without a complex feed device.

A feed powder according to the invention may also comprise one or more of the following optional characteristics:
  More than 95%, preferably more than 99%, preferably more than 99.5%, by number of said particles have a circularity greater than or equal to 0.87, preferably greater than or equal to 0.90;
  The powder contains more than 99.9%, more than 99.950%, more than 99.990%, preferably more than 99.999%, of said silicate; the amount of the other oxides is thus so low that it cannot have a significant effect on the results obtained with a feed powder according to the invention;
  The oxides represent more than 98%, more than 99%, more than 99.5%, more than 99.9%, more than 99.95%, more than 99.985% or more than 99.99% of the weight of the powder;
  The percentage by number of particles having a size of less than or equal to 5 μm is greater than 5%, preferably greater than 10%;
  The percentage by number of particles having a size of greater than or equal to 0.5 μm is greater than 10%;
  The median particle size ($D_{50}$) of the powder is greater than 0.5 μm, preferably greater than 1 μm, indeed even greater than 2 μm, and/or less than 13 μm, preferably less than 12 μm, preferably less than 10 μm or less than 8 μm;
  The 10 percentile particle size ($D_{10}$) is greater than 0.1 μm, preferably greater than 0.5 μm, preferably greater than 1 μm, or even greater than 2 μm;
  The 90 percentile particle size ($D_{90}$) is less than 25 μm, preferably less than 20 μm, preferably less than 15 μm;

The 99.5 percentile particle size ($D_{99.5}$) is less than 40 µm, preferably less than 30 µm;

The size dispersion index $(D_{90}-D_{10})/D_{10}$ is preferably less than 1.5; this advantageously results in a greater coating density;

The powder preferably exhibits a monomodal-type particle size distribution, that is to say a single main peak;

The cumulative specific volume of the pores having a radius of less than 1 µm is less than 8%, preferably less than 6%, preferably less than 5%, preferably less than 4%, preferably less than 3.5%, of the bulk volume of the powder;

The dopant is chosen from the group consisting of the oxides of an element chosen from aluminum, silicon, alkali or alkaline earth metals; iron oxides, more particularly $Fe_3O_4$ or $Fe_2O_3$; $LiYO_2$; mullite; barium and/or strontium aluminosilicate; yttrium aluminum oxide composites, preferably YAG (yttrium aluminum garnet, $Y_3Al_5O_{12}$, comprising about 58% by weight of yttrium oxide) and/or YAP (yttrium aluminum perovskite, comprising about 68.9% by weight of yttrium oxide);

The silicate and the dopant together represent more than more than 90%, indeed even more than 95%, or even more than 98%, or also more than 99%, preferably substantially 100%, of the weight of the powder.

The content of dopant represents more than 0.1%, preferably more than 0.5%, indeed even 1%, indeed even more than 3%, as percentage by weight based on the oxides, of said powder;

The specific surface area of the feed powder is preferably less than 0.4 m²/g, preferably less than 0.3 m²/g.

The invention also relates to a method for manufacturing a feed powder according to the invention, comprising the following successive steps:

a) granulation of a particulate feedstock so as to obtain a powder formed of granules having a median size $D'_{50}$ of between 20 and 60 microns, the particulate feedstock comprising more than 98% of a silicate of one or more elements chosen from Zr, Hf, Y, Ce, Sc, In, La, Gd, Nd, Sm, Dy, Er, Yb, Eu, Pr, Ho and Ta, preferably chosen from Zr, Hf, Y, Ce, Sc, In, La, Gd, Nd, Sm, Dy, Er, Yb, Eu, Pr and Ta, preferably chosen from Y, Yb, Sc and Er, as percentage by weight based on the oxides;

b) injection of said powder formed of granules, via a carrier gas, through at least one injection orifice up to a plasma jet generated by a plasma gun, under conditions which cause shattering prior to fusion of more than 50%, preferably more than 60%, preferably more than 70%, preferably more than 80%, preferably more than 90%, by number of the injected granules, as percentage by number, then fusion of the granules and pieces of granules so as to obtain droplets;

c) cooling of said droplets so as to obtain a feed powder according to the invention;

d) optionally, particle size selection, preferably by screening or by pneumatic classification, of said feed powder.

The violent injection of the powder advantageously makes it possible to simultaneously reduce the median size of the feed powder and to decrease the proportion of hollow particles. It thus makes it possible to obtain a very high relative density.

The plasma gun preferably has a power of greater than 40 kW, preferably of greater than 50 kW, and/or of less than 65 kW, preferably of less than 60 kW.

Preferably, the plasma gun has a power of between 40 to 65 kW and the ratio of the amount by weight of granules injected per injection orifice, preferably through each injection orifice, to the surface area of said injection orifice is greater than 10, preferably greater than 15, preferably greater than 16, preferably greater than or equal to 17, g/min per mm² of surface area of said injection orifice.

The injection orifice, preferably each injection orifice, is preferably composed of a channel, the length of which is greater than one times, preferably two times, indeed even 3 times, the equivalent diameter of said injection orifice.

The flow rate of the injected powder formed of granules is preferably less than 3 g/min, preferably less than 2 g/min, per kW of power of the plasma gun.

There is no intermediate sintering step, and preferably no consolidation between steps a) and b). This absence of an intermediate consolidation step advantageously improves the purity of the feed powder. It likewise facilitates the shattering of the granules in step b).

A method for manufacturing a powder according to the invention may also comprise one or more of the following optional characteristics:

In step a), the granulation is preferably a process of atomization or spray drying or pelletization (transformation into pellets);

In step a), the mineral composition of the powder formed of granules comprises more than 98.5%, preferably more than 99%, preferably more than 99.5%, preferably more than 99.9%, more than 99.5%, more than 99.99%, preferably more than 99.999%, of said silicate, as percentage by weight based on the oxides;

The median circularity $C_{50}$ of the powder formed of granules is preferably greater than 0.85, preferably greater than 0.90, preferably greater than 0.95, and more preferably greater than 0.96;

The 5 percentile circularity of the powder formed of granules, $C_5$, is preferably greater than or equal to 0.85, preferably greater than or equal to 0.90;

The median aspect ratio $A_{50}$ of the powder formed of granules is preferably greater than 0.75, preferably greater than 0.8;

The specific surface area of the powder formed of granules is preferably less than 15 m²/g, preferably less than 10 m²/g, preferably less than 8 m²/g, preferably less than 7 m²/g;

The cumulative volume of pores having a radius of less than 1 µm, measured by mercury porosimetry, of the powder formed of granules is preferably less than 0.5 cm³/g, preferably less than 0.4 cm³/g or more preferably less than 0.3 cm³/g;

The bulk density of the powder formed of granules is preferably greater than 0.5 g/cm³, preferably greater than 0.7 g/cm³, preferably greater than 0.90 g/cm³, preferably greater than 0.95 g/cm³, preferably less than 1.5 g/cm³, preferably less than 1.3 g/cm³, preferably less than 1.1 g/cm³;

The 10 percentile particle size ($D'_{10}$) of the powder formed of granules is preferably greater than 10 µm, preferably greater than 15 µm, preferably greater than 20 µm;

The 90 percentile particle size ($D'_{90}$) of the powder formed of granules is preferably less than 90 µm, preferably less than 80 µm, preferably less than 70 µm, preferably less than 65 µm;

The powder formed of granules preferably has a median size $D'_{50}$ of between 20 and 60 microns;

The powder formed of granules preferably has a percentile $D'_{10}$ of between 20 and 25 µm and a $D'_{90}$ of between 60 and 65 µm;

The 99.5 percentile particle size ($D'_{99.5}$) of the powder formed of granules is preferably less than 100 μm, preferably less than 80 μm, preferably less than 75 μm;

The size dispersion index with respect to $D'_{50}$, ($D'_{90}-D'_{10})/D'_{50}$, of the powder formed of granules is preferably less than 2, preferably less than 1.5, preferably less than 1.2, more preferably less than 1.1;

In step b), the diameter of each injection orifice is less than 2 mm, preferably less than 1.8 mm, preferably less than 1.7 mm, preferably less than 1.6 mm;

In step b), the injection conditions are equivalent to those of a plasma gun having a power of from 40 to 65 kW and generating a plasma jet in which the amount by weight of granules injected through an injection orifice, preferably through each injection orifice, in g/min per mm$^2$ of the surface area of said injection orifice, is greater than 10 g/min per mm$^2$, preferably greater than 15 g/min per mm$^2$; "equivalent" is understood to mean "adapted so that the rate of shattering of the granules (the number of granules shattered divided by the number of granules injected) is identical";

An injection orifice, preferably each injection orifice, defines a, preferably cylindrical, injection channel, preferably with a circular cross section, having a length at least one times, preferably at least two times, indeed even three times, greater than the equivalent diameter of said injection orifice, the equivalent diameter being the diameter of a disk having the same surface area as the injection orifice;

In step b), the flow rate of powder formed of granules is less than 3 g/min, preferably less than 2 g/min, per kW of power of the plasma gun;

The flow rate of the carrier gas (per injection orifice (that is to say, per "powder line")) is greater than 5.5 l/min, preferably greater than 5.8 l/min, preferably greater than 6.0 l/min, preferably greater than 6.5 l/min, preferably greater than 6.8 l/min, preferably greater than 7.0 l/min;

The powder formed of granules is injected into the plasma jet at a feed flow rate of greater than 20 g/min, preferably of greater than 25 g/min, and/or of less than 60 g/min, preferably of less than 50 g/min, preferably of less than 40 g/min, per injection orifice;

The total feed flow rate in terms of granules (cumulative over all the injection orifices) is greater than 70 g/min, preferably greater than 80 g/min, and/or preferably less than 180 g/min, preferably less than 140 g/min, preferably less than 120 g/min, preferably less than 100 g/min;

Preferably, in step c), the cooling of the molten droplets is such that, down to 500° C., the mean cooling rate is between 50 000 and 200 000° C./s, preferably between 80 000 and 150 000° C./s.

The invention also relates to a thermal spraying method, comprising a step of plasma spraying a feed powder according to the invention onto a substrate in order to obtain an environmental barrier coating.

The substrate is preferably a composite composed of SiC grains bonded by an SiC or Si$_3$N$_4$ matrix, called "SiC—SiC" or "SiC—Si$_3$N$_4$".

The invention also relates to a body comprising a substrate and an environmental barrier coating at least partially covering said substrate, said environmental barrier coating being obtained by thermal spraying, preferably plasma thermal spraying, of a feed powder according to the invention or manufactured by a method according to the invention. This body is in particular well suited for use in an environment having a temperature of greater than 1200° C.

Said environmental barrier coating preferably comprises more than 98% of a silicate of one or more elements chosen from Zr, Hf, Y, Ce, Sc, In, La, Gd, Nd, Sm, Dy, Er, Yb, Eu, Pr and Ta, preferably chosen from Y, Yb, Sc and Er, as percentage by weight based on the oxides, and preferably exhibits a porosity of less than or equal to 1.5%, the porosity being measured on a photograph of a polished section of said environmental barrier coating, as described hereinbelow. The porosity of said environmental barrier coating is preferably less than 1%.

Said environmental barrier coating preferably comprises more than 98.5%, preferably more than 99%, preferably more than 99.5%, preferably more than 99.9%, more than 99.95%, more than 99.97%, more than 99.98%, more than 99.99%, preferably more than 99.999%, of said silicate, as percentage by weight based on the oxides.

Such an environmental barrier coating may be manufactured with a thermal spraying method according to the invention.

The substrate may be a part of a gas turbine, of a heat exchanger or of an internal combustion engine.

The invention also relates to the use of such an environmental barrier coating to protect a part in an environment, the temperature of which exceeds 1000° C., 1100° C., 1200° C. or 1300° C., and/or in an aqueous environment.

Definitions

The "impurities" are the unavoidable constituents, introduced unintentionally and necessarily with the starting substances or resulting from reactions between the constituents. The impurities are not necessary constituents but merely tolerated constituents. The degree of purity is preferably measured by GDMS (glow discharge mass spectrometry), which is more precise than ICP-AES (inductively coupled plasma atomic emission spectroscopy).

The "circularity" of the particles of a powder is conventionally determined in the following way: The powder is dispersed over a flat glass pane. The images of the individual particles are obtained by scanning the dispersed powder under an optical microscope while keeping the particles in focus, the powder being illuminated from underneath the glass pane. These images may be analyzed using a device of the Morphologi® G3 type sold by Malvern.

Figure 4:
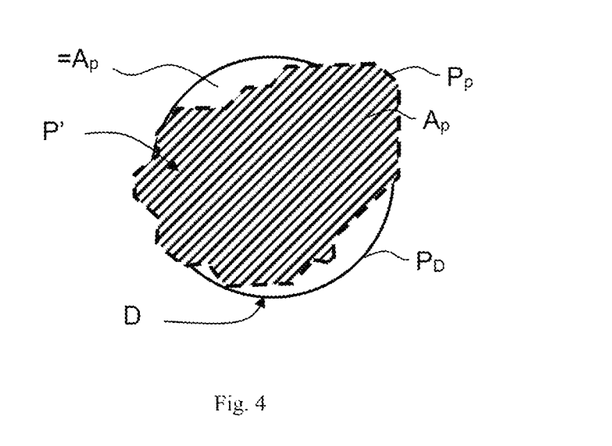
FIG. 4 illustrates the method which is used to evaluate the circularity of a particle.

As represented in FIG. 4, in order to evaluate the "circularity" C of a particle the perimeter $P_D$ of the disk D having an area equal to the area $A_p$ of the particle P' is determined on an image of this particle. The perimeter $P_p$ of this particle is also determined. The circularity is equal to the ratio of $P_D/P_p$. Therefore $$C = \frac{2*\sqrt{\pi A_p}}{P_p}.$$

The more elongate the particle, the lower the circularity. The SYSMEX FPIA 3000 user manual also describes this procedure (see "detailed specification sheets" at www.malvern.co.uk).

In order to determine a circularity percentile (described hereinafter), the powder is poured onto a flat glass pane and observed as explained above. The number of particles counted must be greater than 250 for the measured percentile to be substantially identical, regardless of how the powder is poured onto the glass pane.

The aspect ratio A of a particle is defined as the ratio of the width of the particle (its greatest dimension perpendicular to the direction of its length) to its length (its greatest dimension).

In order to determine an aspect ratio percentile, the powder is poured onto a flat glass pane and observed as explained above, in order to measure the lengths and the widths of the particles. The number of particles counted must be greater than 250 for the measured percentile to be substantially identical, regardless of how the powder is poured onto the glass pane.

The 10 ($M_{10}$), 50 ($M_{50}$), 90 ($M_{90}$) and 99.5 ($M_{99.5}$), and more generally "n" $M_n$, percentiles or "centiles" of a property M of the particles of a powder formed of particles are the values of this property for the percentages, by number, of 10%, 50%, 90%, 99.5% and n %, respectively, on the cumulative distribution curve relating to this property of the particles of the powder, the values relating to this property being classified in increasing order. In particular, the $D_n$ (or $D'_n$ for the powder formed of granules), $A_n$, and $C_n$ percentiles relate to the size, to the aspect ratio and to the circularity, respectively.

For example, 10%, by number, of the particles of the powder have a size of less than $D_{10}$ and 90% of the particles by number have a size of greater than or equal to $D_{10}$. The percentiles relating to the size can be determined using a particle size distribution produced with the aid of a laser particle sizer.

Likewise, 5% by number of particles of the powder have a circularity of less than the $C_5$ percentile. In other words, 95% by number of particles of this powder have a circularity of greater than or equal to $C_5$.

The 50 percentile is conventionally known as the "median" percentile. For example, $C_{50}$ is conventionally known as the "median circularity". Likewise, the $D_{50}$ percentile is conventionally known as the "median size". The $A_{50}$ percentile also conventionally refers to the "median aspect ratio".

"Size of a particle" is understood to mean the size of a particle conventionally given by a particle size distribution characterization performed with a laser particle sizer. The laser particle sizer used may be a Partica LA-950 from Horiba.

The percentage or the fraction by number of particles having a size of less than or equal to a predetermined maximum size may be determined using a laser particle sizer.

The cumulative specific volume of pores having a radius of less than 1 μm, expressed in cm³/g of powder, is conventionally measured by mercury porosimetry according to the standard ISO 15901-1. It may be measured with a MICROMERITICS porosimeter.

The powder bulk volume, expressed in cm³/g, is the reciprocal of the bulk density of the powder.

The "bulk density" P of a powder formed of particles is conventionally defined as the ratio of the weight of the powder divided by the sum of the bulk volumes of said particles. In practice, it may be measured with a MICROMERITICS porosimeter at a pressure of 200 MPa.

The "relative density" of a powder is equal to its bulk density divided by its real density. The real density may be measured by helium pycnometry.

The "porosity" of an environmental barrier coating may be evaluated by image analysis of a polished cross section of the barrier coating. The coated substrate is sectioned using a laboratory cutting machine, for example using a Struers Discotom device with an alumina-based cutting disk. The sample of the environmental barrier coating is then mounted in a resin, for example using a cold mounting resin of the Struers Durocit type. The mounted sample is then polished using polishing media of increasing fineness. It is possible to use sandpaper or, preferably, polishing disks with an appropriate polishing suspension. A conventional polishing procedure begins with dressing of the sample (for example with a Struers Piano 220 abrasive disk), then while changing the polishing cloths associated with the abrasive suspensions. The size of the abrasive grains is reduced at each fine polishing step, the size of the diamond abrasives starting for example at 9 microns, then at 3 microns, to terminate at 1 micron (Struers DiaPro series). For each size of abrasive grain, the polishing is stopped as soon as the porosity observed under an optical microscope remains constant. The samples are carefully cleaned between the steps, for example with water. A final polishing step, after the step of polishing with 1 μm diamond, is carried out using colloidal silica (OP-U Struers, 0.04 μm) combined with a cloth of soft felt type. After the cleaning, the polished sample is ready for observation under an optical microscope or under an SEM (scanning electron microscope). Due to its superior resolution and noteworthy contrast, SEM is preferred for the production of images intended to be analyzed. The porosity may be determined from the images using image analysis software (for example ImageJ, NIH), by adjusting the thresholding. The porosity is given as percentage of the cross-sectional surface area of the environmental barrier coating.

The "specific surface area" is conventionally measured by the BET (Brunauer-Emmett-Teller) method, as described in the *Journal of the American Chemical Society*, 60 (1938), pages 309 to 316.

The "granulation" operation is a method of agglomeration of particles using a binder, for example a polymer binder, to form agglomerated particles which may optionally be granules. Granulation comprises, in particular, atomization or spray drying and/or the use of a granulator or of a pelletizing device, but is not limited to these methods. Conventionally, the binder substantially contains no oxides.

A "granule" is an agglomerated particle having a circularity of 0.8 or more.

A consolidation step is an operation aimed at replacing, in the granules, bonds due to organic binders with diffusion bonds. It is generally performed by heat treatment, but without total melting of the granules.

The "deposition yield" of a plasma spraying method is defined as the ratio, as percentage by weight, of the amount of substance deposited on the substrate divided by the amount of feed powder injected into the plasma jet.

The "spraying productivity" is defined as the amount of substance deposited per unit of time.

The flow rates in l/min are "standard", that is to say measured at a temperature of 20° C. at a pressure of 1 bar.

"To contain" or "to comprise" should be understood in a non-limiting manner, unless otherwise indicated.

Unless otherwise indicated, all the composition percentages are percentages by weight based on the weight of the oxides.

The properties of the powder may be evaluated by the characterization methods used in the examples.

BRIEF DESCRIPTION OF THE FIGURES

Other characteristics and advantages of the invention will become more clearly apparent on reading the following description and on examining the appended drawings, in which.

DETAILED DESCRIPTION

Method for Manufacturing a Feed Powder

Figure 1:
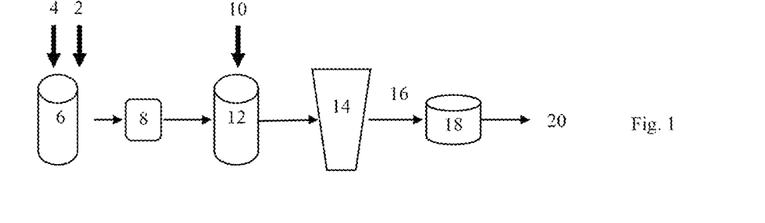
FIG. 1 schematically represents step a) of a method of according to the invention.

FIG. 1 illustrates an embodiment of step a) of a method for manufacturing a feed powder according to the invention.

Any known granulation method may be used. In particular, those skilled in the art know how to prepare a slip suitable for granulation.

In one embodiment, a binder mixture is prepared by addition of PVA (polyvinyl alcohol) 2 to deionized water 4. This binder mixture 6 is then filtered through a 5 μm filter 8. A particulate feedstock, consisting of powdered silicate 10 (for example of 99.99% purity) and having a median size of 1 μm, is mixed into the filtered binder mixture to form a slip 12. The slip may contain, for example, 55% silicate and 0.55% PVA by weight, the remainder to 100% being made up of water. This slip is injected into an atomizer 14 to obtain a powder formed of granules 16. Those skilled in the art know how to adapt the atomizer to obtain the desired particle size distribution.

The granules are preferably agglomerates of particles of an oxide material having a median size preferably of less than 3 μm, preferably less than 2 μm, preferably less than 1.5 μm.

The powder formed of granules may be screened (5 mm screen 18, for example) in order to eliminate the presence of any residues which have fallen from the walls of the atomizer.

The resulting powder 20 is a "spray-dried only", or SDO, powder formed of granules.

Figure 2:
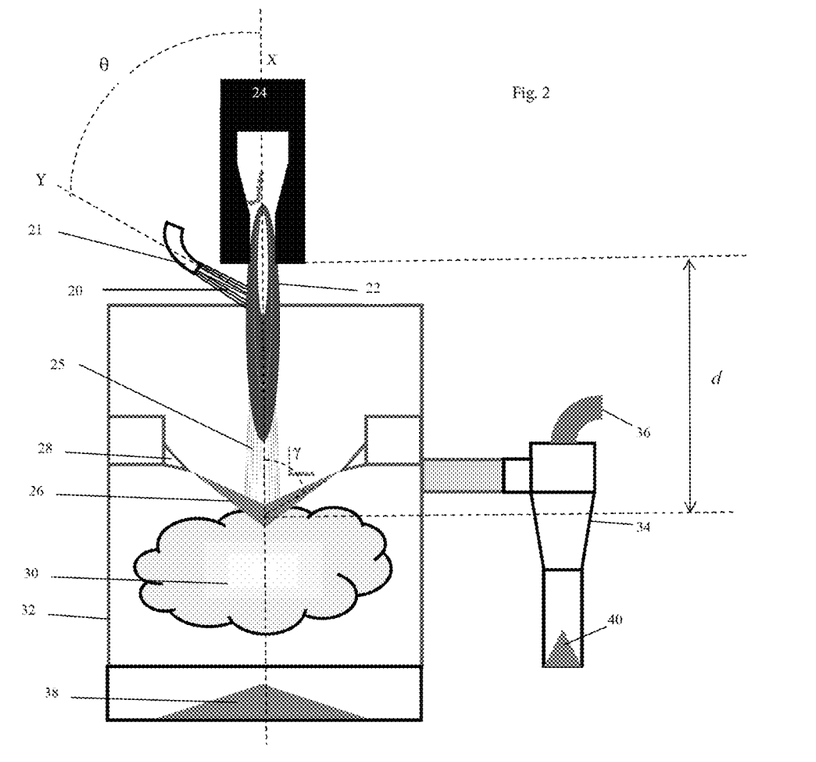
FIG. 2 schematically represents a plasma torch for the manufacture of a feed powder according to the invention.
Figure 3:
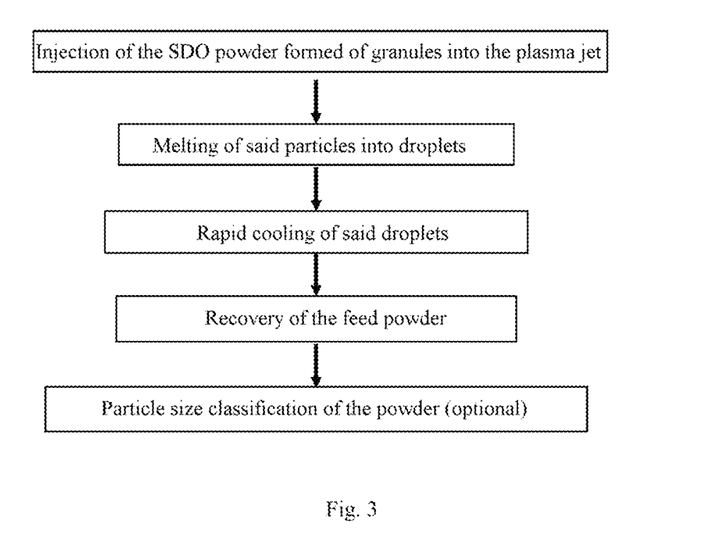
FIG. 3 schematically represents a method for manufacturing a feed powder according to the invention.

FIGS. 2 and 3 illustrate an embodiment of the melting step b) of a method for manufacturing a feed powder according to the invention.

An SDO powder formed of granules 20, for example, such as manufactured according to the method illustrated in FIG. 1, is injected by an injector 21 into a plasma jet 22 produced by a plasma gun 24, for example a ProPlasma HP plasma torch. Conventional injection and plasma spraying devices may be used, so as to mix the SDO powder formed of granules with a carrier gas and to inject the resulting mixture into the core of the hot plasma.

However, the injected powder formed of granules must not be consolidated (SDO), and the injection into the plasma jet should be done abruptly so as to promote breakage of granules. The violence of the impacts determines the intensity of shattering of the granules, and hence the median size of the powder produced.

Those skilled in the art know how to adapt the injection parameters for an abrupt injection of the granules, such that the feed powder obtained at the end of steps c) or d) has a particle size distribution according to the invention.

In particular, those skilled in the art know that:
an approximation of the injection angle θ between the injection axis of the granules Y and the axis X of the plasma jet to 90°,
an increase in the powder flow rate per $mm^2$ of surface area of the injection orifice,
a reduction in the powder flow rate, in g/min, per kW of power of the gun, and
an increase in the flow rate of the plasmagen gas,
are factors which promote breakage of the granules.

In particular, WO2014/083544 does not disclose injection parameters allowing the breakage of more than 50% by number of the granules, as described in the examples hereinbelow.

It is preferable to rapidly inject the particles so as to disperse them in a very viscous plasma jet which flows at a very high speed.

When the injected granules come into contact with the plasma jet, they are thus subjected to violent impacts which can break them into pieces. In order to penetrate into the plasma jet, the unconsolidated, and in particular unsintered, granules to be dispersed are injected at a sufficiently high speed to benefit from a high kinetic energy which is however limited in order to ensure a good shattering efficiency. The absence of consolidation of the granules reduces their mechanical strength, and hence their resistance to these impacts.

Those skilled in the art know that the speed of the granules is determined by the flow rate of the carrier gas and the diameter of the injection orifice.

The speed of the plasma jet is also high. Preferably, the flow rate of plasmagen gas is greater than the median value recommended by the manufacturer of the torch for the anode diameter chosen. Preferably, the flow rate of plasmagen gas is greater than 50 l/min, preferably greater than 55 l/min.

Those skilled in the art know that the speed of the plasma jet may be increased by using a small-diameter anode and/or by increasing the flow rate of the primary gas.

Preferably, the flow rate of the primary gas is greater than 40 l/min, preferably greater than 45 l/min.

Preferably, the ratio of the flow rate of secondary gas, preferably molecular hydrogen ($H_2$), to the flow rate of plasmagen gas (composed of the primary and secondary gases) is between 20% and 25%.

Of course, the energy of the plasma jet, influenced in particular by the flow rate of the secondary gas, must be sufficiently high to melt the granules.

The powder formed of granules is injected with a carrier gas, preferably without any liquid.

In the plasma jet 22, the granules are melted into droplets 25. The plasma gun is preferably adjusted so that the melting is substantially total.

The melting advantageously makes it possible to reduce the content of impurities.

On leaving the hot zone of the plasma jet, the droplets are rapidly cooled by the cold surrounding air, but also by a forced circulation 26 of a cooling gas, preferably air. The air advantageously limits the reducing effect of the hydrogen.

Preferably, the plasma torch comprises at least one nozzle arranged so as to inject a cooling fluid, preferably air, so as to cool the droplets resulting form the heating of the powder formed of granules that has been injected into the plasma jet. The cooling fluid is preferably injected toward the downstream direction of the plasma jet (as represented in FIG. 2) and the angle γ between the path of said droplets and the path of the cooling fluid is preferably less than or equal to 80°, preferably less than or equal to 60° and/or greater than or equal to 10°, preferably greater than or equal to 20°, preferably greater than or equal to 30°. Preferably, the injection axis Y of any nozzle and the axis X of the plasma jet are secant.

Preferably, the injection angle θ between the injection axis Y and the axis X of the plasma jet is greater than 85°, preferably approximately 90°.

Preferably, the forced cooling is generated by a set of nozzles 28 arranged around the axis X of the plasma jet 22 so as to create a substantially conical or annular flow of cooling gas.

The plasma gun 24 is oriented vertically toward the ground. Preferably, the angle α between the vertical and the axis X of the plasma jet is less than 30°, less than 20°, less than 10°, preferably less than 5°, preferably essentially zero. Advantageously, the flow of cooling gas is therefore perfectly centered with respect to the axis X of the plasma jet.

Preferably, the minimum distance d between the outer surface of the anode and the cooling zone (where the droplets come into contact with the injected cooling fluid) is between 50 mm and 400 mm, preferably between 100 mm and 300 mm.

Advantageously, the forced cooling limits the generation of secondaries, resulting from the contact between very large hot particles and small suspended particles in the densification chamber 32. In addition, such a cooling operation makes it possible to reduce the overall size of the processing equipment, in particular the size of the collection chamber.

The cooling of the droplets 25 makes it possible to obtain feed particles 30, which can be removed in the lower portion of the densification chamber 32.

The densification chamber may be connected to a cyclone 34, the exhaust gases of which are directed toward a dust collector 36 so as to separate very fine particles 40. Depending on the configuration, certain feed particles in accordance with the invention may also be collected in the cyclone. Preferably, these feed particles can be separated, in particular with an air separator.

Optionally, the collected feed particles 38 may be filtered such that the median size $D_{50}$ is less than 15 microns.

Table 1 below provides the preferred parameters for manufacturing a feed powder according to the invention. The characteristics of a column are preferably, but not necessarily, combined. The characteristics of both columns may also be combined.

TABLE 1

| | Preferred characteristics | Even more preferred characteristics |
|---|---|---|
| Step b) | | |
| Gun | High-performance gun with low wear (to treat the powder without contaminating it) | ProPlasma HP gun |
| Anode | Diameter >7 mm | HP8 anode (8 mm diameter) |
| Cathode | Doped tungsten cathode | ProPlasma cathode |
| Gas injector | Partially radial injection ("swirling gas injection") | ProPlasma HP setup |
| Current | 500-700 A | 650 A |
| Power | >40 kW | >50 kW, preferably approximately 54 kW |
| Nature of the primary gas | Ar or $N_2$ | Ar |
| Flow rate of the primary gas | >40 l/min, preferably >45 l/min | 50 l/min |
| Nature of the secondary gas | $H_2$ | $H_2$ |
| Flow rate of the secondary gas | >20 vol % of the plasmagen gas mixture | 25 vol % of the plasmagen gas mixture |
| Injection of the powder formed of granules | | |
| Total flow rate of injected powder (g/min) (3 injection orifices) | <180 g/min (preferably <60 g/min per injector) | <100 g/min |
| Flow rate in g/min per kW of power | <5 | <2 |
| Diameter of the injection orifices (mm) | <2 mm preferably <1.8 mm | ≤1.5 mm |
| Flow rate in g/min per mm² of injection orifice surface area | >10 | >15 and <20 |
| Nature of the carrier gas | Ar or $N_2$ | Ar |
| Flow rate of the carrier gas per injection orifice | >6.0 l/min, preferably >6.5 l/min | ≥7.0 l/min |
| Injection angle with respect to the axis X of the plasma jet (angle θ in FIG. 2) | >85° | 90° |
| Distance between an injection orifice and the axis X of the plasma jet | >10 mm | ≥12 mm |

TABLE 1-continued

| | Preferred characteristics | Even more preferred characteristics |
|---|---|---|
| Cooling of the droplets | | |
| Cooling parameters | Conical or annular air curtain, oriented toward the downstream direction of the plasma jet | |
| Angle γ between the direction of injection of the cooling fluid, from a nozzle, and the axis X of the plasma jet | Toward the downstream direction of the plasma jet, ≥10° | Toward the downstream direction of the plasma jet, ≥30° and <60° |
| Total flow rate of the forced cooling fluid | 10-70 Nm³/h | 35-50 Nm³/h |
| Flow rate of the exhaust gas | 100-700 Nm³/h | 250-500 Nm³/h |

The "ProPlasma HP" plasma torch is sold by Saint-Gobain Coating Solutions. This torch corresponds to the torch T1 described in WO2010/103497.

The tests have shown that a feed powder according to the invention exhibits a relative density of greater than 90%, indeed even of greater than 95%.

The invention thus provides a feed powder exhibiting a size distribution and a relative density which confer a very high density upon the environmental barrier coating. Furthermore, this feed powder may be efficiently plasma sprayed with good productivity.

Of course, the invention is not limited to the embodiments described and represented.

The invention claimed is:

1. A powder formed of fused particles, more than 95% by number of said feed particles exhibiting a circularity of greater than or equal to 0.85, said powder containing more than 88% of a silicate of one or more elements chosen from Zr, Hf, Y, Ce, Sc, In, La, Gd, Nd, Sm, Dy, Er, Yb, Eu, Pr, Ho and Ta, less than 10% of a dopant, as percentage by weight based on the oxides, and having:
a median particle size $D_{50}$ of less than 15 μm, a 90 percentile particle size, $D_{90}$, of less than 30 μm, and a size dispersion index $(D_{90}-D_{10})/D_{10}$ of less than 2;
a relative density of greater than 90%,
the $D_n$ percentiles of the powder being the particle sizes corresponding to the percentages, by number, of n %, on the cumulative distribution curve of the size of the particles of the powder, the particle sizes being classified in increasing order.

2. The powder as claimed in claim 1, exhibiting:
a percentage by number of particles having a size of less than or equal to 5 μm which is greater than 5%, and/or
a median particle size $D_{50}$ of less than 10 μm, and/or
a 90 percentile particle size $D_{90}$ of less than 25 μm, and/or
a 99.5 percentile particle size $D_{99.5}$ of less than 40 μm, and/or
a size dispersion index $(D_{90}-D_{10})/D_{10}$ of less than 1.5.

3. The powder as claimed in claim 1, wherein the median particle size $D_{50}$ is less than 8 μm.

4. The powder as claimed in claim 1, said element being Y and/or Yb and/or Sc and/or Er.

5. The powder as claimed in claim 1, said dopant being chosen from the group consisting of the oxides of an element chosen from aluminum, silicon, alkali or alkaline earth metals; iron oxides; $LiYO_2$; mullite; barium and/or strontium aluminosilicate; and yttrium aluminum oxide composites.

6. A method for manufacturing a powder, said method comprising the following steps:

a) granulation of a particulate feedstock so as to obtain a powder formed of granules having a median size $D'_{50}$ of between 20 and 60 microns, the particulate feedstock comprising more than 98% of a silicate of one or more elements chosen from Y, Ce, Sc, In, La, Gd, Nd, Sm, Dy, Er, Yb, Eu, Pr, Ta, Zr, Ho and Hf, as percentage by weight based on the oxides;

b) injection of said powder formed of granules, via a carrier gas, through at least one injection orifice up to a plasma jet generated by a plasma gun, under injection conditions which cause shattering of more than 50% by number of the injected granules, as percentage by number, so as to obtain molten droplets;

c) cooling of said molten droplets so as to obtain said feed powder as claimed in claim 1;

d) optionally, particle size selection of said feed powder.

7. The method as claimed in claim 6, wherein the injection conditions are predetermined so as to cause shattering of more than 70% of the injected granules, as percentage by number.

8. The method as claimed in claim 7, wherein the injection conditions are predetermined so as to cause shattering of more than 90% of the injected granules, as percentage by number.

9. The method for manufacturing a powder as claimed in claim 6, wherein, in step b), the injection conditions are adapted to cause a rate of shattering of the granules identical to a plasma gun having a power of from 40 to 65 kW and generating a plasma jet in which the amount by weight of granules injected through each injection orifice, in g/min per mm² of the surface area of said injection orifice, is greater than 10 g/min per mm².

10. The method as claimed in claim 9, in which the amount by weight of granules injected through each injection orifice, in g/min per mm² of the surface area of said injection orifice, is greater than 15 g/min per mm².

11. The method for manufacturing a powder as claimed in claim 6, wherein said injection orifice defines an injection channel exhibiting a length at least one times greater than the equivalent diameter of said injection orifice.

12. The method as claimed in claim 11, in which said length is at least two times greater than said equivalent diameter.

13. The method for manufacturing a powder as claimed in claim 6, wherein, in step b), the flow rate of powder formed of granules is less than 3 g/min per kW of power of the plasma gun.

14. The method as claimed in claim 6, wherein the granulation comprises an atomization.

15. A thermal spraying method, comprising a step of thermal spraying of a powder as claimed in claim 1.

16. A method to manufacture a body comprising a substrate and an environmental barrier coating at least partially covering said substrate, said method comprising a plasma thermal spraying of a powder as claimed in claim 1 to obtain said environmental barrier coating.

17. A method according to claim 16, in which said body is placed in an environment having a temperature of greater than 1200° C.

* * * * *